United States Patent [19]

Sakaue et al.

[11] 4,340,375
[45] Jul. 20, 1982

[54] ELECTRONIC LEARNING AID

[75] Inventors: Takashi Sakaue, Nara; Koichi Hatta, Yamatokoriyama; Megumi Fukusaki, Osaka; Yoshiro Kataoka, Yamatokoriyama, all of Japan

[73] Assignee: Sharp Kabushiki Kaisha, Osaka, Japan

[21] Appl. No.: 188,865

[22] Filed: Sep. 19, 1980

Related U.S. Application Data

[63] Continuation of Ser. No. 952,203, Oct. 17, 1978, abandoned.

[30] Foreign Application Priority Data

Oct. 20, 1977 [JP] Japan ................. 52/126957

[51] Int. Cl.³ .................................... G09B 7/00
[52] U.S. Cl. .................... 434/201; 434/335
[58] Field of Search .............. 434/201, 202, 335, 362

[56] References Cited

U.S. PATENT DOCUMENTS

| | | |
|---|---|---|
| 3,584,226 | 6/1971 | Divine et al. .................. 434/201 |
| 3,584,398 | 6/1971 | Meyer et al. .................. 434/201 |
| 3,787,988 | 1/1974 | Nakajima et al. .................. 434/201 |
| 3,925,909 | 12/1975 | Duncan .................. 434/201 |
| 3,947,976 | 4/1976 | Hafel .................. 434/201 |
| 3,974,575 | 8/1976 | Duncan .................. 434/201 |
| 4,010,556 | 3/1977 | Ellsworth et al. .................. 434/201 |
| 4,016,411 | 4/1977 | Genin .................. 434/201 X |
| 4,040,048 | 8/1977 | Lien .................. 434/188 X |
| 4,051,605 | 10/1977 | Toal et al. .................. 434/201 |
| 4,052,799 | 10/1977 | Journet .................. 434/362 |
| 4,117,607 | 10/1978 | Gill .................. 434/201 |
| 4,126,949 | 11/1978 | Simone .................. 434/202 |

Primary Examiner—William H. Grieb
Attorney, Agent, or Firm—Birch, Stewart, Kolasch & Birch

[57] ABSTRACT

An electronic learning aid includes a circuit for automatically developing problems, a display for displaying the problems, an input for introducing a calculated answer, and a determination circuit for detecting whether the introduced answer is correct. The display includes a first display unit of plural digits for displaying the problems, and a second display unit of plural digits for displaying the problem number, the score, the correct answer number, and the exercise number.

14 Claims, 22 Drawing Figures

ELECTRONIC LEARNING AID

This is a continuation of Ser. No. 952,203 filed on Oct. 17, 1978, now abandoned.

BACKGROUND AND SUMMARY OF THE INVENTION

The present invention relates to an electronic learning aid.

The present invention relates, more specifically, to an electronic learning aid which automatically provides and displays problems of mathematics. Students introduce their answer through key input means after calculation with figures. The electronic learning aid functions to compare the introduced answer with a correct answer stored therein.

A typical electronic learning aid is commercially available, such as "LITTLE PROFESSOR" (trade name) manufactured by Texas Instruments Incorporated. The "LITTLE PROFESSOR" automatically provides problems for exercise, and functions to compare the correct answer with an answer introduced by students through key input means. The score is displayed on a display panel when a predetermined number of problems are completed.

The present invention is to improve the above-mentioned electronic learning aid.

Accordingly, an object of the present invention is to provide an electronic learning aid of easier handling.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The electronic learning aid of the present invention mainly comprises means for automatically providing and displaying problems, input means for introducing an answer calculated by students, means for determining whether the introduced answer is correct, and means for reporting the determination results. To achieve the above objects, pursuant to an embodiment of the present invention, a display means includes two display units of plural digits. The display units display various information in addition to the problems, for example, a percentage score, a selected number of problems, a number of correct answers, and problem group number.

In a preferred form, to facilitate an understanding as to whether the introduced answer is correct, the display means is driven to flicker and/or an alarm phone is generated.

The answer calculated by the student is introduced into a storage means and stored therein. Thereafter, the thus stored answer is compared with the correct answer when the student operates an answer key ASW.

A slidable switch is provided for selecting a desired level of difficulty. After selection of the levels of difficulty, when a preparation key PRE is operated, the digit number of problems is displayed on the display means in a manner, for example, "00+00".

A switch is provided for selecting a desired number of problems. The number of problems can be selected among "10", "25" and "100".

Numeral keys, the answer key ASW, and a clear key CLR are provided for introducing the calculated answer. A counter means is associated with operations of the answer key ASW and the clear key CLR for counting the number of correct answers.

In order to repeatedly select a same problem group, a predetermined problem is developed upon combined operation of the numeral keys and a start key STR.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 7 and 8 are schematic views showing contents of the random access memory of FIG. 6;

FIGS. 10, 11, 14, 18 and 22 are plan views of display conditions achieved by the display panel of FIG. 3.

DESCRIPTION OF THE PREFERRED EMBODIMENTS

Figure 1:
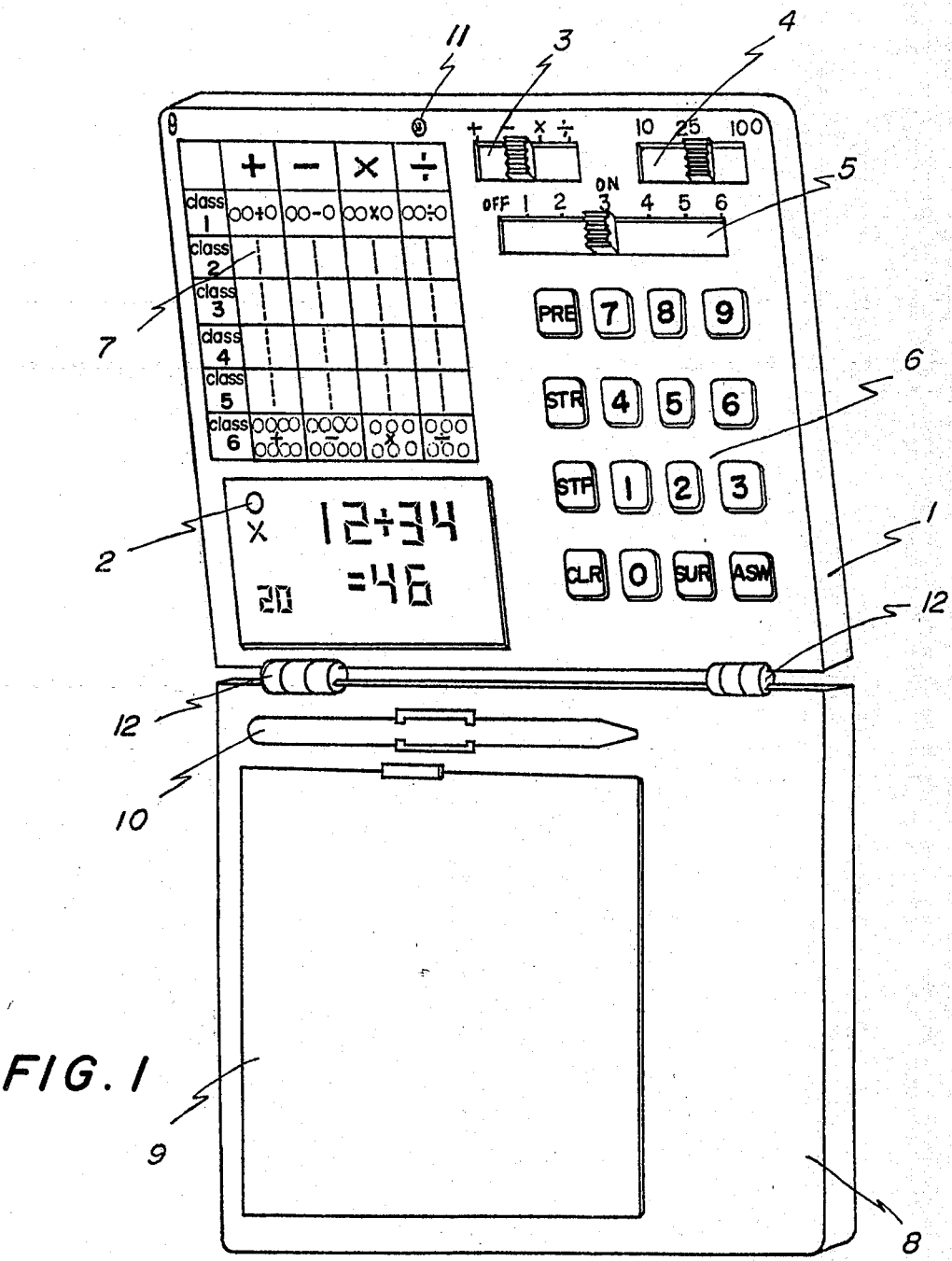
FIG. 1 is a perspective view of an embodiment of an electronic learning aid of the present invention.

FIG. 1 shows an embodiment of an electronic learning aid of the present invention.

The electronic learning aid mainly comprises a display panel 2, a key input means 6, a memorandum note 9, and a table of levels of difficulty 7. A main cabinet 1 encloses an electronic assembly and a power source. The display panel 2 comprises two display units of plural digits for displaying problems, answers, and various information. A problem kind selection switch 3 is provided for selecting the problem among add, subtract, multiply and divide. A problem number selection switch 4 is provided for selecting the number of problems among "10", "25" and "100".

A slidable switch 5 is provided for controlling power supply and for selecting a desired level of difficulty. The key input means 6 includes numeral keys, and function keys such as an answer key ASW and a clear key CLR. The table 7 indicates kinds of problems and the levels of difficulty.

Another cabinet 8 is rotatably secured to the main cabinet 1 through hinges 12. The memorandum note 9 and a pencil 10 are supported by the cabinet 8. A power supply switch 11 is disposed on the cabinet 1 so that the power supply switch 11 is switched on when the main cabinet 1 is rotated to open the electronic learning aid.

Figure 2:
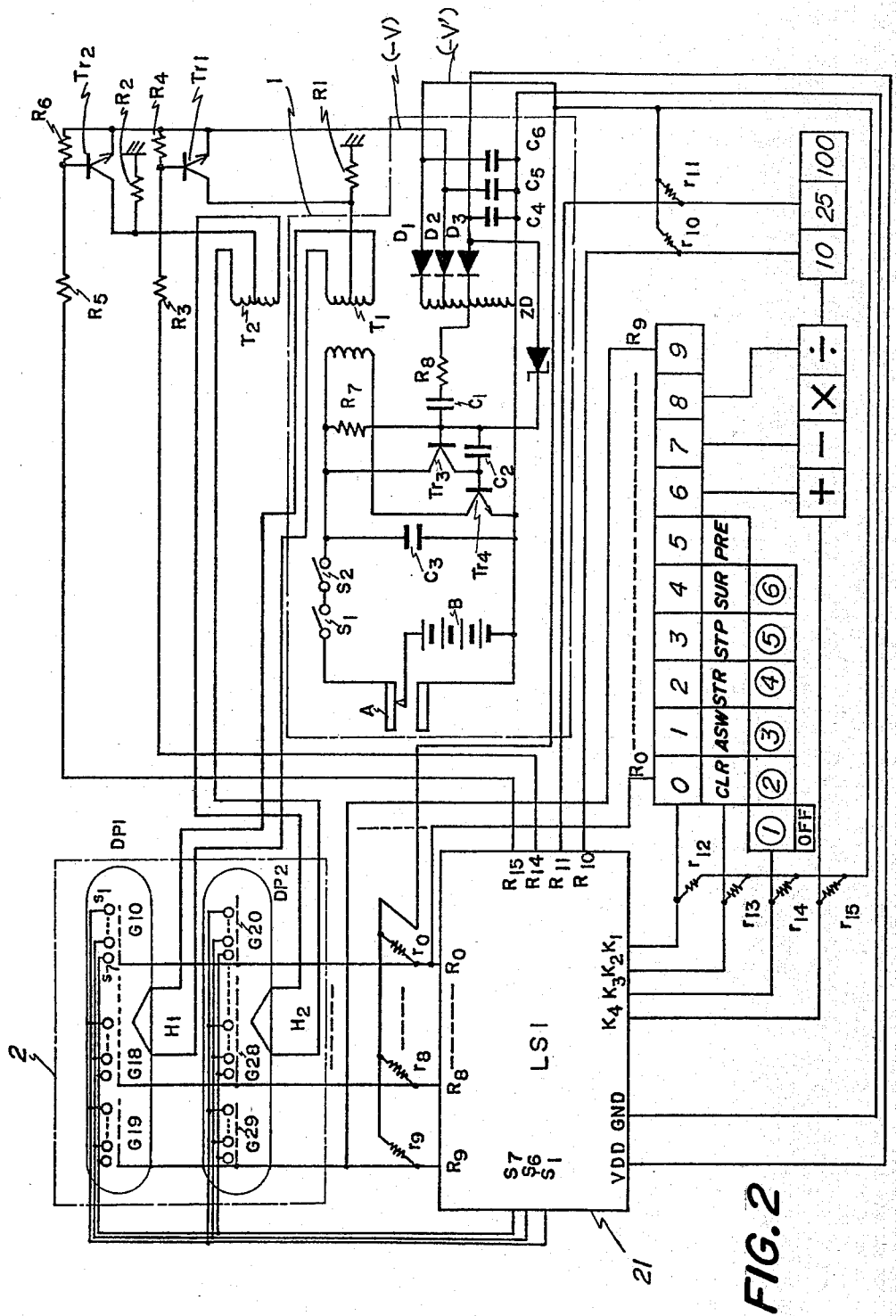
FIG. 2 is a block diagram of an electronic assembly of the electronic learning aid of FIG. 1.

FIG. 2 shows an electronic assembly of the electronic learning aid of the present invention.

The electronic assembly mainly comprises an LSI 21 including a processor, read only memory (ROM) and a random access memory (RAM). The read only memory (ROM) stores microprograms in a firmwave fashion. The LSI 21 includes power supply terminals GND and $V_{DD}$, input terminals $K_1$ through $K_4$, display segment information output terminals $S_1$ through $S_7$, and timing signal output terminals $R_0$ through $R_{11}$, $R_{14}$ and $R_{15}$.

The display panel 2 comprises a ten digit fluorescent display unit $DP_1$ and another ten digit fluorescent display unit $DP_2$.

Figure 3:
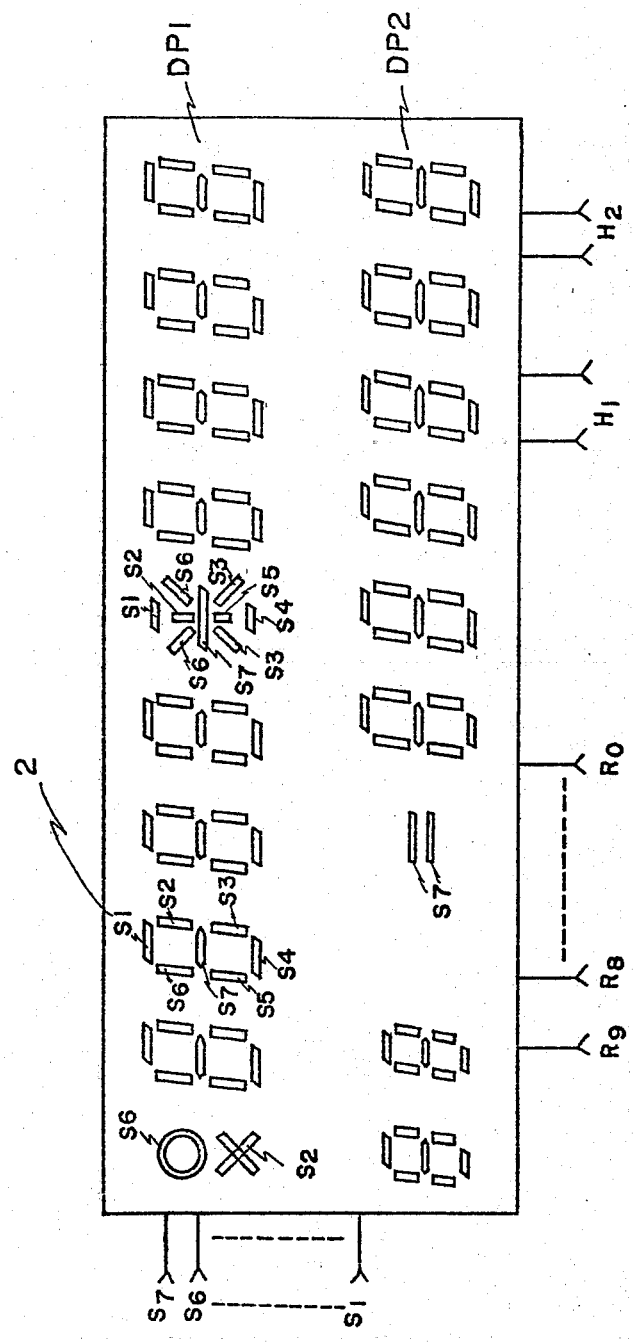
FIG. 3 is a plan view of a display panel included in the electronic learning aid of FIG. 1.

FIG. 3 shows the segment configuration of the display units $DP_1$ and $DP_2$.

Display electrodes of the first through fourth digits of the upper display unit $DP_1$ are shaped " 8 ", the fifth digit is shaped " ※ " to display symbols of add, subtract, multiply and divide, the sixth through ninth digits are shaped " 8 ", and the tength digit of the upper display unit $DP_1$ is provided for displaying a symbol "o" or "x" indicating whether the calculated answer is correct or not. Display electrodes of the first through sixth digits of the bottom display unit $DP_2$ are shaped " 8 ", the seventh digit is shaped "=", the eighth digit is blank, and the ninth and tenth digits are shaped " 8 ". The display electrodes are divided into groups $S_1$ through $S_7$, and the display electrodes of the same group are commonly connected to each other.

Referring again to FIG. 2, a heater $H_1$ of the display unit $DP_1$ and a heater $H_2$ of the display unit $DP_2$ are energized by alternating power sources $T_1$ and $T_2$, respectively. The heater $H_1$ of the display unit $DP_1$ is maintained at the voltage level $-V$ only when a transistor $Tr_1$ is on. The heater $H_2$ of the display unit $DP_2$ is maintained at the voltage level $-V$ only when a transistor $Tr_2$ is on. The heaters $H_1$ and $H_2$ are grounded through resistors $R_1$ and $R_2$, respectively, when the voltage $-V$ is not applied thereto.

The corresponding segment electrodes of the display units $DP_1$ and $DP_2$ are commonly connected to each other and, then, connected to receive display information signals derived from the output terminals $S_1$ through $S_7$ of the LSI 21. The display unit $DP_1$ includes grids $G_{10}$ through $G_{19}$, and the display unit $DP_2$ includes grids $G_{20}$ through $G_{29}$. The first digit grids $G_{10}$ and $G_{20}$ are connected to the timing signal output terminal $R_0$ of the LSI 21. In a same way, the ninth digit grids $G_{18}$ and $G_{28}$ are connected to the timing signal output terminal $R_8$, and the tength digit grids $G_{19}$ and $G_{29}$ are connected to the timing signal output terminal $R_9$.

Figure 4:
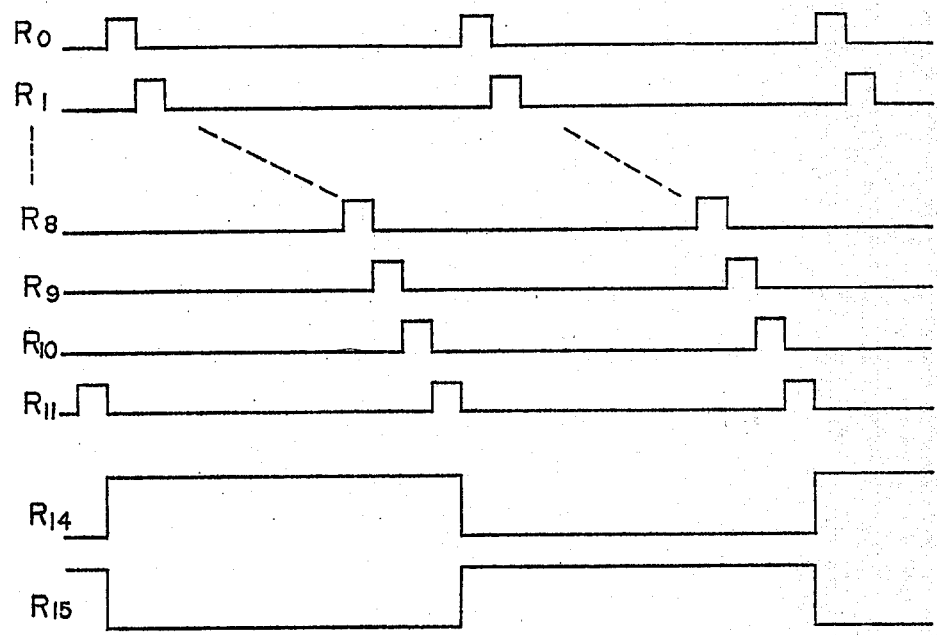
FIG. 4 is a time chart showing various signals developed from an LSI included in the electronic assembly of FIG. 2.

The signals derived from the timing signal output terminals $R_0$ through $R_{11}$ of the LSI 21 are digit time signals for controlling the information display. FIG. 4 is a time chart showing waveforms of the digit time signals derived from the timing signal output terminals $R_0$ through $R_{11}$. The timing signal output terminals $R_{14}$ and $R_{15}$ develop word time signals, which invert their logic values every twelve (12) digit time. The word time signals are applied to the transistors $Tr_1$ and $Tr_2$ to alternatively turn on the transistors $Tr_1$ and $Tr_2$. Therefore, the display units $DP_1$ and $DP_2$ are alternatingly energized in a word time fashion.

A power supply circuit I comprises a jack A for receiving outer power supply, a power source cell B, a power supply switch $S_1$ corresponding to the power supply switch 11 of FIG. 1, another power supply switch $S_2$ corresponding to the slidable switch 5 of FIG. 1, a switching transistor $Tr_3$ functioning as a DC—DC converter, a transistor $Tr_4$ for oscillation purposes, a resistor $R_7$ for initial start purposes, a limiting resistor $R_8$, a Zener diode ZD for controlling the oscillation operation, capacitors $C_1$ and $C_2$, a rippling capacitor $C_3$, rectifying diodes $D_1$ through $D_3$, and smoothing capacitors $C_4$ through $C_6$. The power supply circuit I develops the heater drive alternating voltage, and negative potential drive voltages $V_{DD}$, $-V$ and $-V'$. The power supply circuit I can be of the conventional construction.

The selection switches 3, 4 and 5, and the key input means 6 are controlled in the key strobing fashion. The numeral keys "0" through "9" are controlled by the timing signals derived from the output terminals $R_0$ through $R_9$ of the LSI 21 to develop a timing signal toward the input terminal $K_1$ corresponding to the operated numeral key. The clear key CLR, the answer key ASW, the start key STR, the stop key STP, the surplus key SUR and the preparation key PRE are controlled by the timing signals derived from the output terminals $R_0$ through $R_5$ to supply the input terminals $K_2$ with the timing signal corresponding to the operated function key.

The level selection terminals ② through ⑥ are controlled by the timing signals $R_0$ through $R_4$ to supply the input terminal $K_3$ with the timing signal corresponding to the selected level of difficulty. Similarly, the problem kind selection terminals ⊞, ⊟ and ⊡, and the problem number selection terminals [10] and [25] are controlled by the timing signals $R_6$, $R_7$, $R_8$, $R_{10}$ and $R_{11}$ to supply the input terminal $K_4$ with the timing signal corresponding to the selected kind and number. The output terminals $R_0$ through $R_{11}$, and the input terminals $K_1$ through $K_4$ are clamped to the level $-V'$ by clamping resistors $r_0$ through $r_{15}$.

When, for example, the numeral key "2" is operated, the input terminal $K_1$ receives the timing signal derived from the output terminal $R_2$, whereby the LSI 21 detects that the numerals key "2" is operated. Similarly, when the problem kind ⊞ and the problem number [10] are selected, the timing signals derived from the output terminals $R_6$ and $R_{10}$ are applied to the input terminal $K_4$, whereby the LSI 21 detects that the problem kind ⊞ and the problem number [10] are selected.

The level selection terminal ①, the problem kind selection terminal ⊠, and the problem number selection terminal [100] do not receive any timing signals. The LSI 21 is constructed to detect that the above-mentioned terminals are selected, when the input terminals $K_3$ and $K_4$ do not receive any timing signals when the power supply switch is closed.

Figure 5:
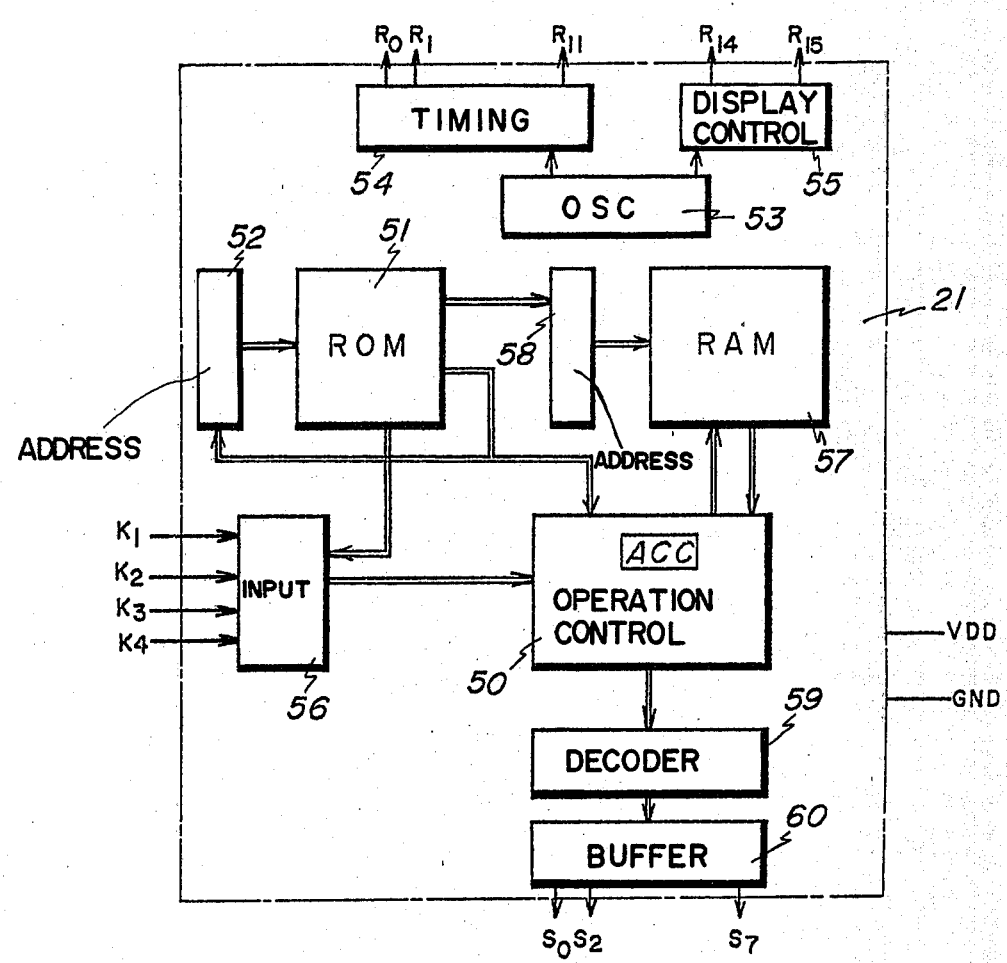
FIG. 5 is a block diagram of an LSI included in the electronic assembly of FIG. 2.

FIG. 5 shows the construction of the LSI 21.

The LSI 21 mainly comprises an operation control 50, a read only memory (ROM) 51 for storing a microprogram orders, and an address counter 52 for selecting a desired address of the ROM 51.

The ROM 51 is programmed in the firmwave fashion, and the detailed storing condition will be described later. The LSI 21 further comprises a timing source oscillator 53, a timing signal generator 54 for developing the timing signals through the output terminals $R_0$ through $R_{11}$, and a display control signal generator 55 for developing the timing signals through the output terminals $R_{14}$ and $R_{15}$.

The key input signals and the selection signals are applied to an input section 56 through the input terminals $K_1$ through $K_4$. The input section 56 receives control signals derived from the read only memory 51 to develop code signals corresponding to the operated keys.

The LSI 21 further includes a random access memory (RAM) 57 for storing data and memorizing the internal condition of the LSI 21. The information stored in the random access memory 57 is applied to the operation control 50 in response to control signals derived from an address counter 58 which is controlled by the read only memory 51. In the display cycle, the information introduced into the operation control 50 is developed from the output terminals $S_0$ through $S_7$, as the segment selection signals, through a segment decoder 59 and a buffer circuit 60.

The timing signals derived from the output terminals $R_0$ through $R_{11}$ function to scan the display digits, the key input means, and the selection switches as shown in FIG. 2. The input information obtained by the above-mentioned scanning operation is applied to the input section 56 through the input terminals $K_1$ through $K_4$.

Figure 6:
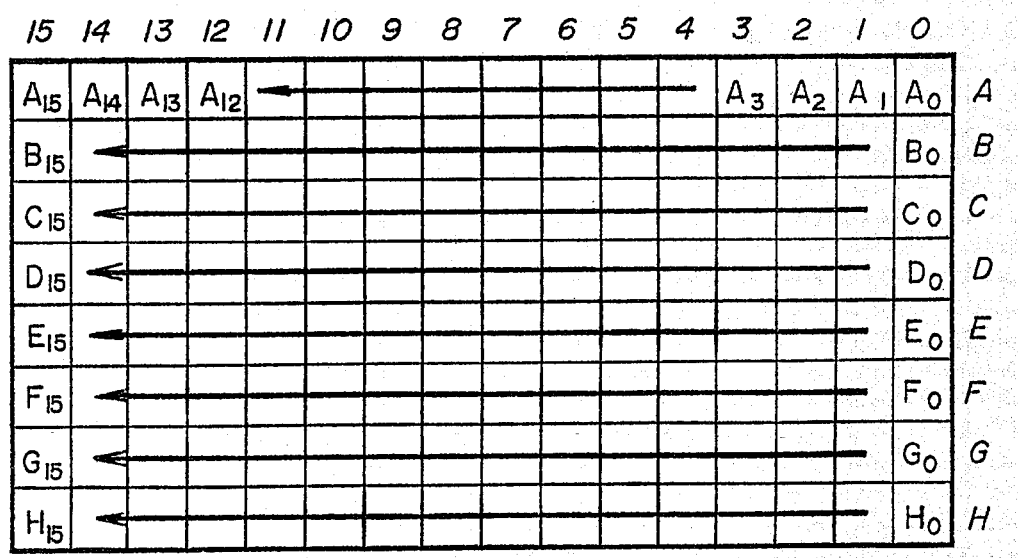
FIG. 6 is a schematic view showing a construction of a random access memory included in the LSI of FIG. 5.

FIG. 6 schematically shows the construction of the random access memory (RAM) 57, which comprises eight memories A through H, each memory comprising sixteen digits, and each digit comprising four bits.

Figure 7:
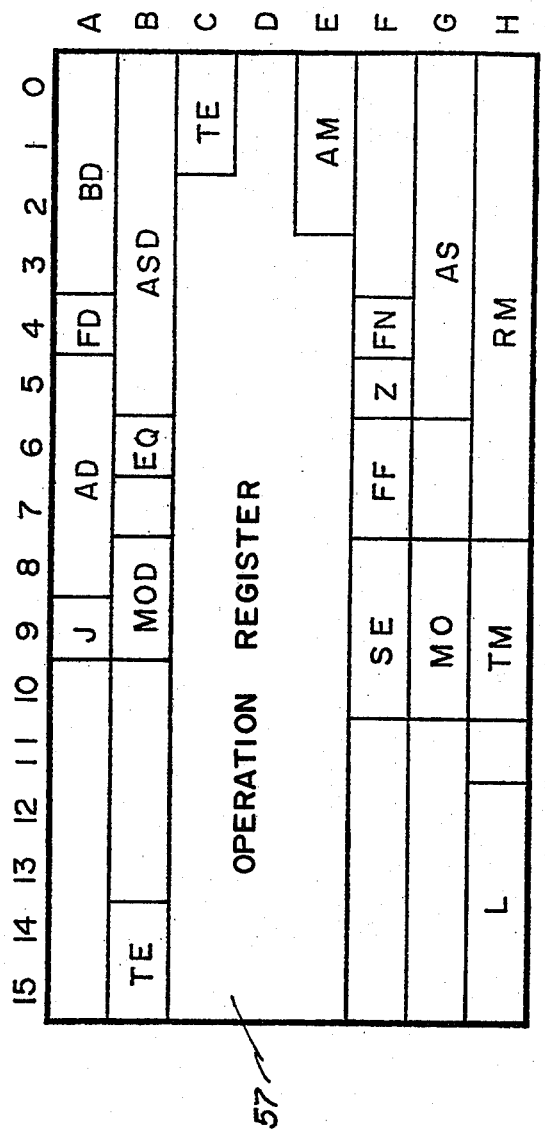
Figure 8:
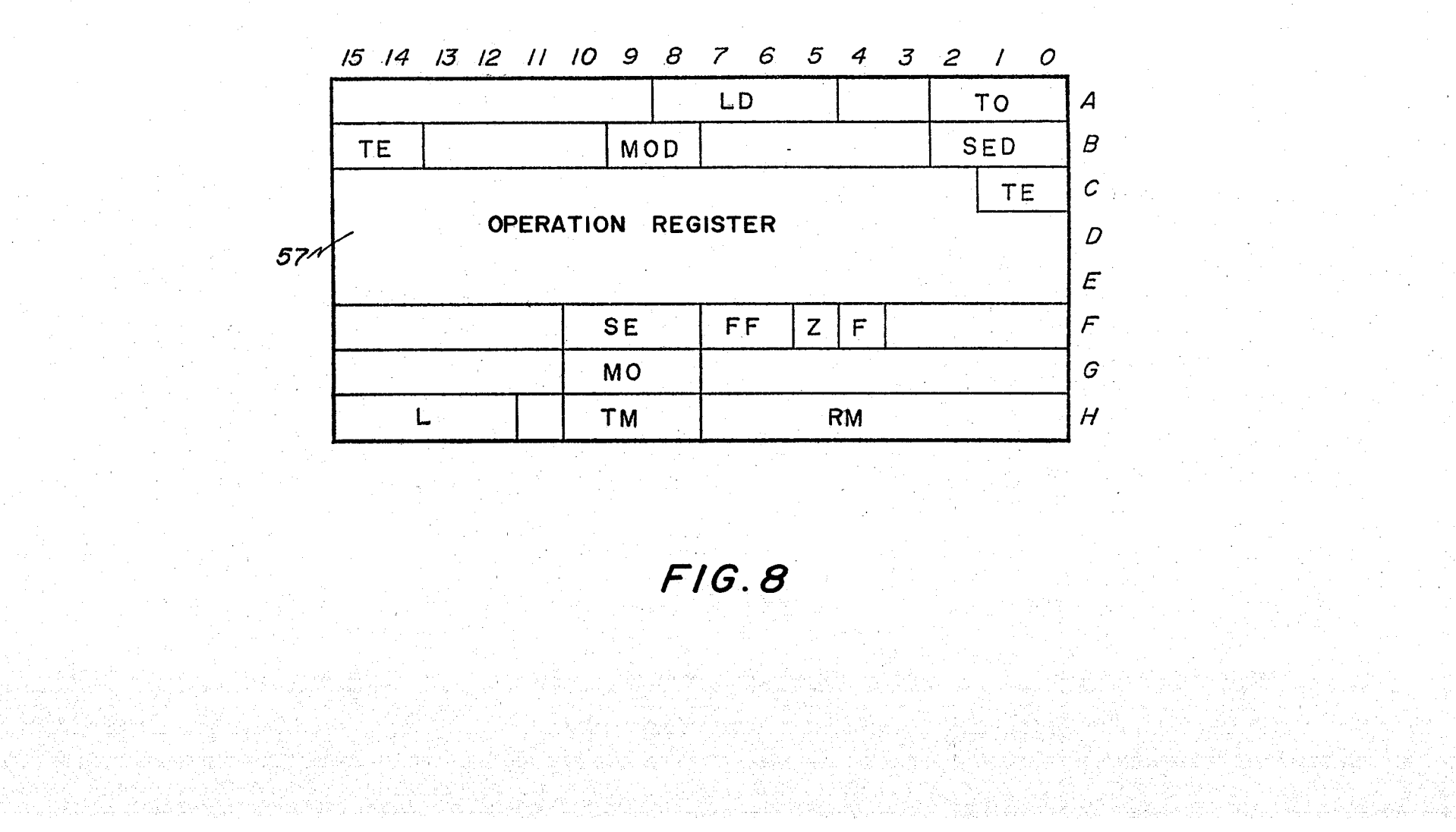

FIG. 7 shows a condition of the RAM 57 wherein the problem is generated and displayed on the display panel. FIG. 8 shows a condition of the RAM 57 wherein the series of problems are completed or the stop key STP is operated, and the score, the number of problems, the number of correct answers, and the problem number are displayed.

In FIG. 7, the memories $A_0$ through $A_9$, and $B_0$ through $B_9$ are used as the display registers. The memories $A_0$ and $B_0$ correspond to the first digit, and the memories $A_9$ and $B_9$ correspond to the tenth digit. The register $A_9(J)$ is for displaying the symbols "0" and "x" (0 ... code "6", x ... code "1"), the register $A_5$-$A_8$. (AD) is for displaying the operand, the register $A_4$(FD) is for displaying the function symbols (+ ... code "10", − ... code "11", × ... code "12", and ÷ ... code "13"), and the register $A_0$–$A_3$ (BD) is for displaying the operand. The memories $B_0$ through $B_9$ are divided into a problem number display register MOD ($B_8$, $B_9$), an equal symbol display register EQ($B_6$) (= ... code "11"), and an answer display register ASD($B_0$-$B_5$). The contents stored in the above-mentioned registers are displayed on the display panel 2. A correct answer storage register AS($G_0$-$G_5$) stores the correct answer calculated by the operation register. A problem number storage register MO ($G_8$-$G_{10}$) functions to count up the number of problems. The contents stored in the problem number storage register MO are applied to the register MOD for display purposes.

An exercise number storage register L($H_{12}$-$H_{15}$) stores a selected exercise number (selected group number). The contents of the register L are set by the numeral keys and the start key STR. The contents of the register L are automatically set to "1" when the power supply switch is switched on. A correct answer number storage register SE ($F_8$-$F_{10}$) stores the number of correct answers. The operation control 50 functions to compare the contents stored in the register ASD with that of the register AS, and develop a signal to add "1" to the contents stored in the register SE when the contents stored in the register ASD and AS coincide with each other.

A problem total number storage register RM ($H_8$-$H_{10}$) stores the total problem number selected by the problem number selection switch 4. A random number storage register RM($H_0$-$H_7$) stores the random numbers for creating the problems. An operation function storage register FN ($F_4$) stores the kind of problems selected by the problem kind selection switch 3. The addition code is "1010", the subtraction code is "1011", the multiplication code is "1100", and the division code is "1101".

A register Z($F_5$) stores the information related to the levels of difficulty selected by the level selection switch 5. A flag register FF($F_6$-$F_7$) stores the information related to the control condition of the LSI 21 and functions as condition flip-flops for developing flag signals $F_{61}$, $F_{62}$, $F_{63}$, $F_{64}$, $F_{71}$ and $F_{72}$. A register TE ($B_{14}$-$B_{15}$, $C_0$-$C_1$) is provided for flickering the display when the correct answer is introduced or the 100% score is obtained. Count up operation is conducted till the contents of the register TE reach a predetermined value. A surplus storage register AM($E_0$-$E_2$) stores the remainder in the division problem.

In FIG. 8, the RAM 57 stores the information related to the score display. The contents of the display registers are changed from that of FIG. 7. Remainings are not changed.

In the score display mode, the date stored in the display registers ($A_0$-$A_9$, $B_0$-$B_7$) are cleared. The exercise number information stored in the exercise number storage register L($H_{12}$-$H_{15}$) is transferred to a exercise number display register LD($A_5$-$A_8$). Similarly, the correct answer number information stored in the correct answer number storage register SE($F_8$-$F_{10}$) is read out, and the percentage score is calculated and transferred to a score display register TO($A_0$-$A_2$). The contents stored in the register SE are transferred to a correct answer number display register SED ($B_0$-$B_2$). The contents stored in the register MOD are maintained unchange.

Typical operation modes will be described hereinbelow.

Functions of the keys and switches will be described first.

The kind selection switch 3 is a slidable switch having four positions for selecting the kind of problems among addition, subtraction, multiplication and division.

The problem number selection switch 4 is a slidable switch having three positions for selecting the problem number among "10", "25", and "100".

The level selection switch 5 is a slidable switch having six positions for selecting levels of difficulty.

The preparation key PRE is operated to set the kind of problem, the level of difficulty, and the problem number. The set information is introduced into the LSI 21 when the preparation key PRE is operated.

The start key STR is operated when the exercise is initiated. Upon operation of the start key STR, the problem generation mode is set. The problems are automatically generated in accordance with the selected kind of problems and the selected exercise number.

The numeral keys "0" through "9" are operated to select the exercise number, and to introduce the calculated answer. The numerals keys "0" through "9" are used as the answer input keys only in the problem generation mode.

The surplus key SUR is provided for introducing the remainder in the division problem. The quotient and the remainder are introduced into the system in the following manner.

"quotient"→  →"remainder"→ 

The answer key ASW is operated to initiate the determination operation for detecting whether the introduced answer is correct or not.

The stop key STP is operated to terminate or reset the problem generation mode. When the stop key STP is operated, the score and the correct answer number are displayed.

The clear key CLR is operated to correct the introduced exercise number and the introduced answer, and to repeat the calculation when the introduced answer is not correct.

The operation flow is as follows:

When the power supply switch is closed, or when the preparation key PRE is operated, the digit number of the problem is displayed through the use of "0".

More specifically, the digit number of the operands is selected through the level selection switch 5 and the problem kind selection switch 3. The thus selected digit number of the operands of the problems is displayed on the display panel 2 through the use of the numeral "0".

Figure 9:
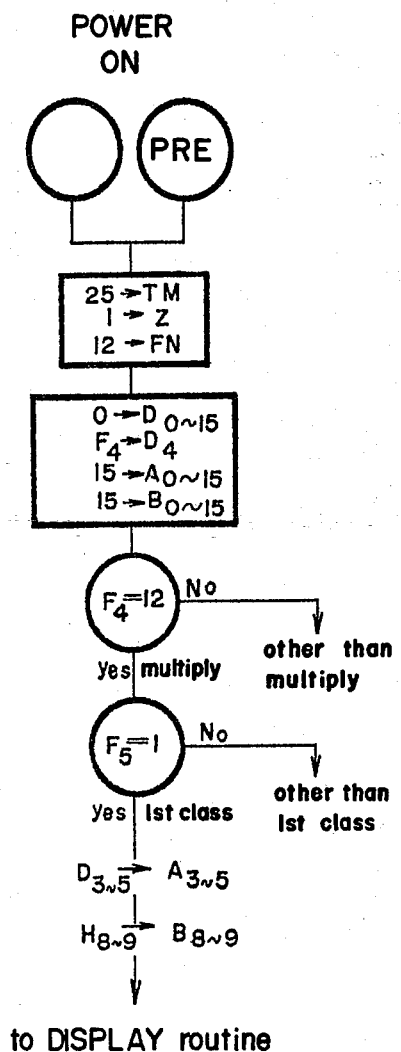
FIGS. 9, 12, 13, 15, 16, 17, 19, 20 and 21 are flow charts for explaining operation of the electronic learning aid of FIG. 1.

A typical operation will be described with reference to the FIG. 9 flow chart, when the multiplication, the first class and the 25 problems are set after power supply and the preparation key PRE is operated.

When the preparation key PRE is operated, the information "25" related to the problem number, "12" of the multiplication code, and "1" related to the level of difficulty is introduced into the registers TM, FN and Z, respectively. The memory sections $D_0-D_{15}$ are cleared, and the function (X) stored in the register $FN(F_4)$ is transferred to the memory section $D_4$. Thereafter, information "1111" is introduced into the memory sections $A_0-A_{15}$ and $B_0-B_{15}$ to extinguish the display.

The contents "12" stored in the register $F_4$ are detected to set the multiplication problem generation mode. The contents "1" stored in the register $F_5$ are detected to set the first class level, whereby the contents stored in the section $D_3-D_5$ are transferred to the section $A_3-A_5$. The selected problem number stored in the section $H_8-H_9$ is transferred to the section $B_8-B_9$. Under these conditions, the display panel 2 displays "0×0" and the problem number "25" as shown FIG. 10. FIG. 11 shows another embodiment, wherein the digit number of operand is diaplayed through the use of symbol other than "0".

The above-mentioned operation is controlled by the microprogram order derived from the read only memory ROM. In other words, the read only memory ROM is programmed in the firmwave fashion.

Figure 12:
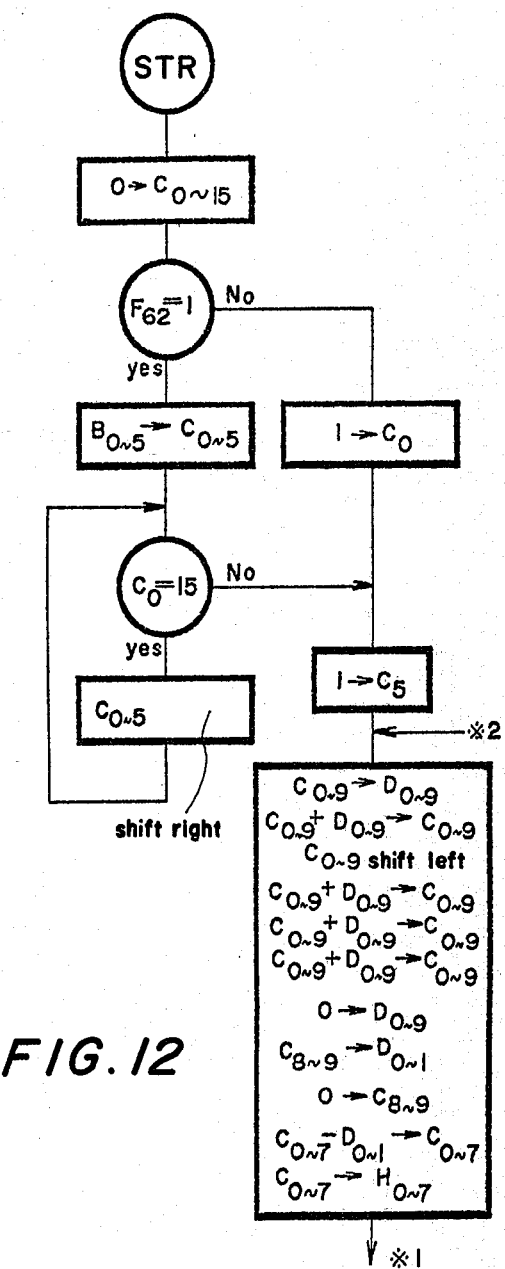

A start key STR is operated to initiate the problem creation. The problem generation operation will be described with reference to the FIG. 12 flow chart.

There are two modes for initiating the exercise. In the first mode, only the start key STR is operated. In the second mode, the start key STR is operated after selection of the problem group through the use of the numeral keys. The problems are created through the use of the random numbers. The problems are determined in accordance with a given initial value, which relates to the number indicating the selected problem group. Therefore, same problems are developed as long as the same problem group is selected.

When the start key STR is operated, the memory section $C_0-C_{15}$ is cleared. The contents stored in the flag register $F_{62}$ are checked. The flag register $F_{62}$ (see FIG. 15) is a flip-flop which is set when the numeral keys are operated to introduce the numeral information into the system. Therefore, the flag register $F_{62}$ is in the set condition when the problem group is selected, and the information related to the selected problem group is stored in the memory section $B_0-B_5$.

When the flip-flop $F_{62}$ is in the set condition, the contents stored in the section $B_0-B_5$ are transferred to the section $C_0-C_5$. The contents stored in the section $C_0-C_5$ are shifted right till the blank signal "15" disappears at the section $C_0$. With this operation, the introduced numeral information for selecting a desired problem group is stored in the section $C_0-C_5$ in such a manner that the section $C_0$ stores the first digit information. Contrarily, when the start key STR is operated without selection of the problem group, the information "1" is introduced into the section $C_0$ after detection of $F_{62}=0$. That is, the problem group "1" is automatically selected.

Thereafter, information "1" is introduced into the section $C_5$, and the random numbers are generated in the following manner through the use of the contents stored in the memory section $C_0-C_9$ as the initial value.

$$X_{i+1} = 23X_i(\text{mode } 10^8+1)$$

That is, the number $X_{i+1}$ is the remainder of $23X_i \div (10^8+1)$.

More specifically, the contents stored in the memory section $C_0-C_9$ are transferred to the memory section $D_0-D_9$. And, the sum of $(C_0-C_9)+(D_0-D_9)$ is introduced into the memory section $C_0-C_9$. Then, the contents stored in the memory section $C_0-C_9$ are shifted left by one digit, and the operation $(C_0-C_9)+(D_0-D_9)\rightarrow(C_0-C_9)$ is conducted three times. Thereafter, the contents stored in the section $D_0-D_9$ are cleared. Then, the contents stored in the section $C_8-C_9$ are transferred to the section $D_0-D_1$. The contents stored in the section $C_8-C_9$ are cleared, and the following operation is conducted.

$$(C_0-C_7)-(D_0-D_1)\rightarrow(C_0-C_7)$$

The contents stored in the section $C_0-C_7$ are transferred to the random number storage register $H_0-H_7$ to generate the problem through the use of the thus obtained random number. The above-mentioned operation for providing the random number is repeated through the use of the contents stored in the register $H_0-H_7$ to create the next problem.

When, for example, the initial value is "100001", the following random numbers are sequentially developed.

"2300023", "52900529", "16712155",
"84379562", "40729907", ...

When the problem number group "7" is selected, the initial value is "100007", and the following random numbers are sequentially developed.

(2300161), (52903703), (16785157), (86058608), (79347965), ...

Figures 13, 15:
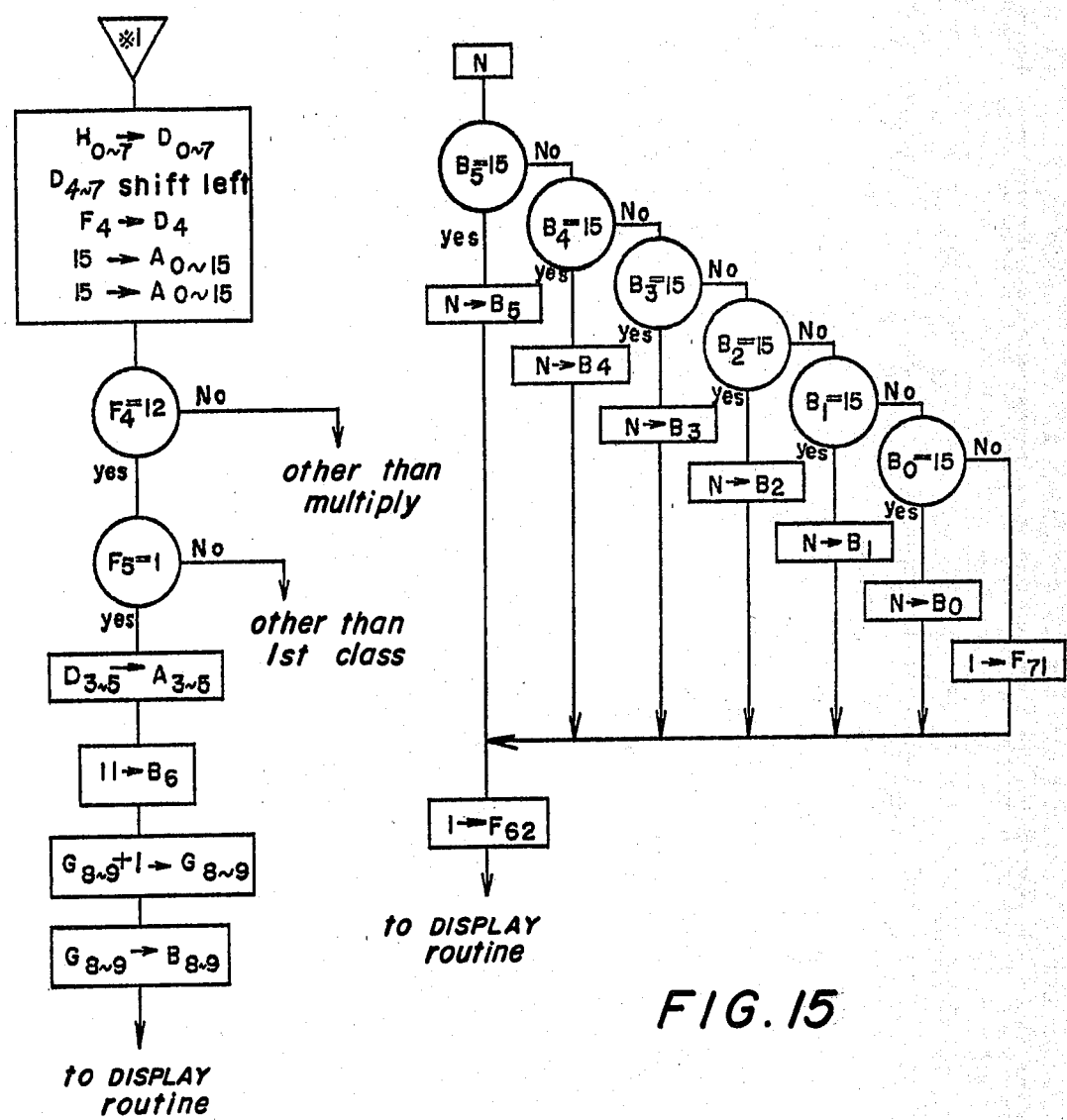

FIG. 13 shows a flow of operation for creating and displaying problems through the use of the above-mentioned random numbers.

In the present system, the operands are displayed close to the function symbol (+, −, X, ÷) to facilitate the recognition of problems.

Now assume that the problem group number "1", the multiplication, and the first class of level of difficulty are selected. The first random number "2300023" and the second random number "52900529" are developed but not used to form the problem, because the fourth and fifth digits are "0". The third random number "16712155" is used to form the first problem.

The contents stored in the random number storage register $H_0-H_7$ are transferred to the memory section $D_0-D_7$. The contents stored in the section $D_4-D_7$ are shifted left by one digit. Then, the function symbol (x) stored in the register $F_4$ is transferred to the section $D_4$. At this moment, the contents stored in the section $D_0-D_7$ are ($671 \times 2155$). The blank information "15" is introduced into the memory sections $A_0-A_{15}$ and $B_0-B_{15}$. The contents stored in the registers $F_4$ and $F_5$ are detected, which show that the problem kind is the multiplication and the level of difficulty is the first class. The memory section $D_3-D_5$ is selected and transferred to the section $A_3-A_5$. The code "11" for displaying the equal symbol "=" is introduced into the register $B_6$. The information "1" is added to the contents stored in the problem number storage register $G_8-G_{10}$. In the initial condition, the contents stored in the register $F_8-G_{10}$ are cleared. The thus obtained problem number information $G_8-G_9$ is transferred to the section $B_8-B_9$. With this operation, the display panel 2 displays the multiplication problem ($1 \times 2$), the equal symbol (=), and the problem number (1) as shown in FIG. 14.

The correct answer of the displayed problem is calculated in the operation control 50, and stored in the register AS ($G_0-G_5$) in such a manner that the uppermost digit is placed at the section $G_5$.

The above-mentioned operation is repeated to subsequently form the multiplication problems, ($7 \times 9$), ($2 \times 9$), . . . .

The student calculates the problem displayed on the display panel 2, and inputs his answer through the key input means 6.

The system is constructed to read in more digits than the display capability. The introduced answer is stored in the system, and the error detection is conducted when the answer key ASW is operated.

This is to preclude the erroneous detection, wherein the introduced answer is not correct but the displayed answer is correct. For example, the display capability is six digits. Now the problem is $823 \times 571$ (=469933). When the student introduces his answer "4699330", the answer display is "469933" and, therefore, the answer is correct in appearance.

FIG. 15 shows operation for introducing the answer obtained by the student. $\boxed{N}$ represents the operation of the numeral keys. When the first numeral key is operated, $B_5=15$ is detected to introduce the numeral N into the section $B_5$. At this moment, the flag register $F_{62}$ is set. When the second numeral key is operated, $B_5 \neq 15$ and $B_4=15$ are detected to introduce the numeral N into the section $B_4$. In the same way, the numeral information is stored in the section $B_0-B_3$. When the seventh numeral key is operated, $B_0-B_5 \neq 15$ and, therefore, the flag register $F_{71}$ is set. The flip-flop $F_{71}$ indicates that the numeral information of more digits than the display ability is introduced.

Figure 16:
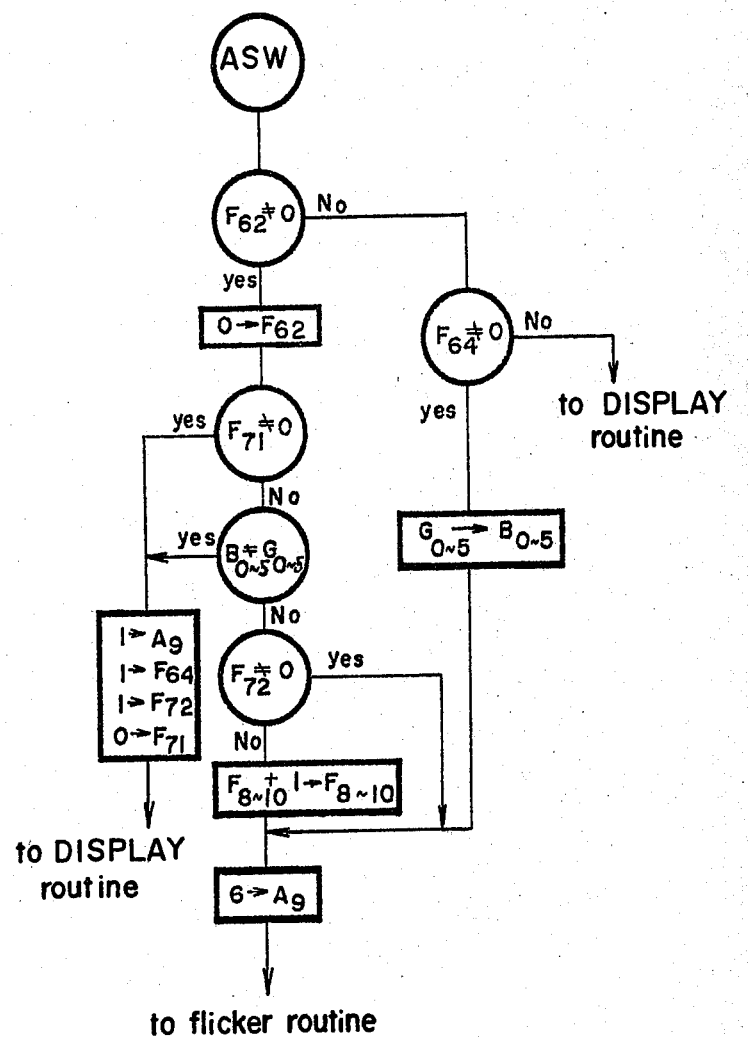
Figure 17:
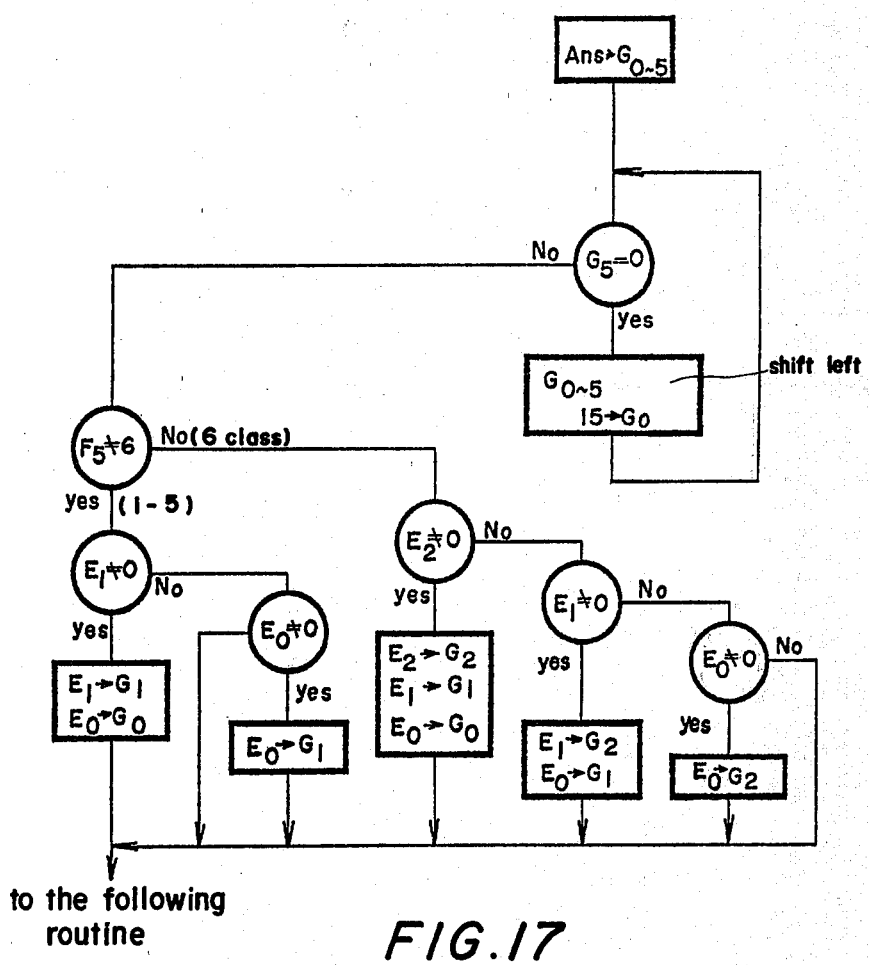

When the answer key ASW is operated, the correct answer is read out and compared with the introduced answer. The operation is controlled in accordance with the conditions of the flag registers $F_{62}$ and $F_{64}$. FIG. 16 shows the operation following the depression of answer key ASW.

When the answer key ASW is operated, the detection is carried out whether the register $F_{62}$ is "0". When the flip-flop $F_{62}$ is in the set condition, the flip-flop $F_{62}$ is reset, and the operation is advanced to the detection of the flag register $F_{71}$. When the flag register $F_{71}$ is in the set condition, the introduced answer is not correct and, therefore, the code "1" for displaying the symbol "x" is introduced into the register $A_9$. The flag flip-flops $F_{64}$ and $F_{72}$ are set, and the flip-flop $F_{71}$ is reset to advance to the display routine, wherein the symbol "x" is displayed at the uppermost digit of the upper display unit.

Contrarily, when the flag $F_{71}$ is in the reset state, the contents stored in the memory section $B_0-B_5$ are compared with the correct answer stored in the memory section $G_0-G_5$. When the affirmative answer is not obtained, the operation is shifted to the above-mentioned routine $1 \to A_9$, $1 \to F_{64}$ and $1 \to F_{72}$. When the affirmative answer is obtained, the flag $F_{72}$ is checked. When the flip-flop $F_{72}$ is in the reset state, the correct answer number storage register $F_8-F_{10}$ is increased by one.

The code "6" is introduced into the register $A_9$ to display the symbol "0", and the program is advanced to the correct answer flicker routine. Contrarily, when the flip-flop $F_{72}$ is in the set state, the contents stored in the register $F_8-F_{10}$ are not increased, tne the program is advanced to the correct answer flicker coutine.

When the introduced answer is not correct, the symbol "x" is displayed, and the flip-flop $F_{64}$ is set. Thereafter, when the answer key ASW is again operated, the correct answer stored in the memory section $G_0-G_5$ is transferred to the memory section $B_0-B_5$ and displayed on the display panel 2, since the flip-flop $F_{62}$ is in the reset state, and the flip-flop $F_{64}$ is in the set state.

The following is the operation for displaying the remainder in the division problem.

In the present system, the quotient and remainder are displayed on the display panel 2 with the blank separation.

Now assume that the integer quotient is stored in the section $G_0-G_5$, and the remainder is stored in the section $E_0-E_2$. The quotient and the remainder are displayed in a way shown in FIG. 18.

The integer quotient is stored in the section $G_0-G_5$ in such a manner that the uppermost digit is positioned at the section $G_5$. That is, the correct answer calculated in the LSI 21 is stored in the section $G_0-G_5$, and shifted left until the uppermost digit $G_5$ receives the information. The blank signal "15" is introduced into the lowermost digit. After detection of the appearance of the information at the section $G_5$, the contents of the memory $F_5$ are detected to determine whether the sixth class level is selected.

The level of difficulty in the division problem is as follows:

class 1 . . . (two digits ÷ one digit)
class 2 . . . (two digits ÷ one digit)
class 3 . . . (three digits ÷ one digit)
class 4 . . . (three digits ÷ two digits)
class 5 . . . (four digits ÷ two digits)
class 6 . . . (four digits ÷ three digits)

The class 5 problem includes the three digit quotient, at the maximum, and the two digit remainder at the maximum. The class 6 problem includes the two digit quotient, at the maximum, and the three digit remainder at the maximum. Therefore, the remainder is displayed at the first and second digits from the end in the class 5 problems. The remainder is displayed at the first through third digits from the end in the class 6 problems. The display section for displaying the remainder is changed in the class 6 problems from that of the problems of classes 1–5.

More specifically, the contents of the memory $F_5$ are checked to determine whether the selected level is class 6. In the class 6 problem, the contents stored in the memories $E_2$, $E_1$ and $E_0$ are checked whether they are not zero, and the contents stored in the section $E_2$–$E_0$ are transferred to the section $G_2$–$G_0$. In the problem other than the class 6, the detection is conducted to the memories $E_1$–$E_0$, and the contents are transferred to the section $G_1$–$G_0$. In this way, the memory $G_0$–$G_5$ stores the quotient and the remainder with the intervention of the blank digit.

That is, when the answer key ASW is repeatedly operated to display the correct answer, the contents stored in the section $G_0$–$G_5$ are transferred to the section $B_0$–$B_5$. FIG. 18 shows a typical display condition in the class 3 problem (9876÷5). The blank digit for separating the quotient and the remainder can be filled with a specific symbol.

The following in the operation of the clear key CLR.

When the clear key CLR is operated after introduction of the numeral information, the operation is cleared even when the flag $F_{71}$ already set. Therefore, the student can again introduce his answer and operate the answer key ASW to check his answer. When the clear key CLR is operated in the condition where the student introduced his answer and operated the answer key ASW and the symbol "x" is displayed, the symbol "x" is disabled. The answer again introduced is checked but the system does not count up as the correct answer is introduced.

Figure 19:
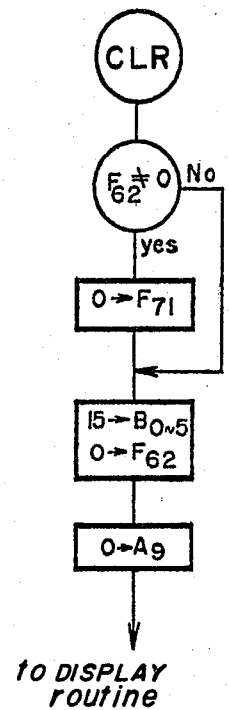

FIG. 19 shows the above-mentioned operation.

When the numeral information is introduced into the system, the flag $F_{62}$ is set as shown in FIG. 15. When the introduced numeral information exceeds the six digits, the flip-flop $F_{71}$ is set. At this moment when the clear key CLR is operated, the set state of $F_{62}$ is detected, and the flip-flop $F_{71}$ is reset. The blank signal "15" is introduced into the display register $B_0$–$B_5$, and the flip-flop $F_{62}$ is reset. Thereafter, the new answer is introduced into the system, and checked when the answer key ASW is operated in a manner shown in FIG. 16. That is, the set state of the flip-flop $F_{62}$, the reset state of the flip-flop $F_{71}$, the coincidence of the contents of $B_0$–$B_5$ and $G_0$–$G_5$, and the reset state of the flip-flop $F_{72}$ are determined, and the contents of the correct answer number storage register $F_8$–$F_{10}$ are increased by one.

In case where the answer key ASW has already been operated after introduction of an erroneous answer or the numeral information above six digits, following operation is conducted to display "x".

1→$A_9$
set $F_{64}$ and $F_{72}$
reset $F_{62}$ and $F_{71}$

Under these conditions, when the clear key CLR is operated, the reset state of the flip-flop $F_{62}$ is detected. The blank signal "15" is applied to the display register $B_0$–$B_5$, and the flip-flop $F_{62}$ is reset. However, the flip-flops $F_{72}$ and $F_{64}$ are maintained at the set states. When the newly introduced answer is correct, the symbol "0" is displayed upon operation of the answer key ASW.

However, the memory $F_8$–$F_{10}$ does not count up because the flip-flop $F_{72}$ is in the set state.

The display flicker routine will be described below.

Figure 20:
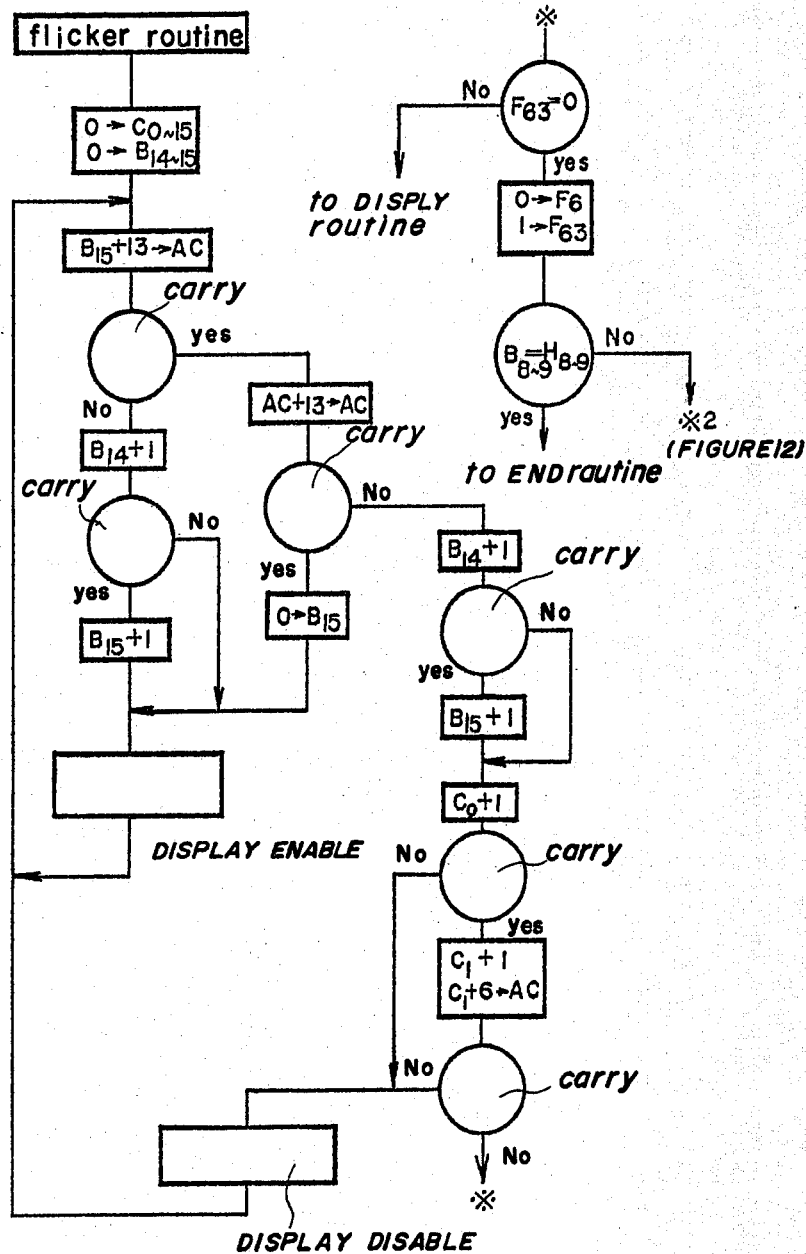

When the introduced answer is correct, the entire digits of display are controlled to flicker. FIG. 20 shows the flicker routine.

The memory sections $C_0$–$C_{15}$ and $B_{14}$–$B_{15}$ are cleared, and the information 13(1101) is introduced into the section $B_{15}$. The thus obtained data is stored in an accumulator ACC in the operation control 50, and the carry generation is detected. At this moment, since the carry is not developed, the information "1" is introduced into the section $B_{14}$. The carry is not developed and, therefore, the program is advanced to the display enable routine. In the display enable routine, the contents stored in the memories $A_0$–$A_9$ and $B_0$–$B_9$ are displayed in a dynamic fashion by one cycle (one cycle of the timing signal $R_{14}$ or $R_{15}$). The information "13" is again added to the contents stored in the section $B_{15}$. The above-mentioned operation is repeated.

At the sixteenth add "1" to the memory $B_{14}$ operation, the carry is developed and, therefore, the information "1" is added to the memory $B_{15}$. At the thirty-second repetition, the carry is developed from the memory $B_{15}$, and the information "13" is added to the accumulator ACC in the operation control 50. At this moment, the carry is not developed from the accumulator ACC and, hence, the operation is advanced to the step to add "1" to the memory $B_{14}$. The memory $B_{14}$ becomes "1" and does not develop the carry. The program is advanced to add "1" to the memory $C_0$. The carry is not develop and, therefore, the program is advanced to the display disable routine to extinguish the display for a period of time identical to that is determined by the display enable routine.

The program is returned to the step for adding "13" to the memory $B_{15}$. At this moment, the carry is developed since the memory $B_{15}$ stores "3" in advance. Therefore, the operation for adding "1" to the memory $B_{14}$ is again conducted. The operation is repeated. At the sixteenth operation, the carry is developed from $B_{14}$ to add one to the memory $B_{15}$. Therefore, the contents of the memory $B_{15}$ become "4". By repeating this operation by thirty-two times, the carry is developed from the memory $B_{15}$, and the accumulator ACC stores the information "3". Accordingly the accumulator ACC develops the carry upon receiving the information "13", whereby the memory $B_{15}$ is reset to return the program to the display enable routine.

When the display enable routine and the display disable routine are repeated once, the memory $C_1$ stores "3". Therefore, when the enable/disable cycle is repeated three times, the contents stored in the memory $C_1$ are "9". In the fourth flicker routine, the memory $C_1$ stores "10" and develops the carry upon receiving the information "6". When this carry is developed, the filter routine is terminated, and the program is advanced to the following problem number check routine. In a preferred form, the display flickers three times with the time interval of 0.4 sec.

Figure 21:
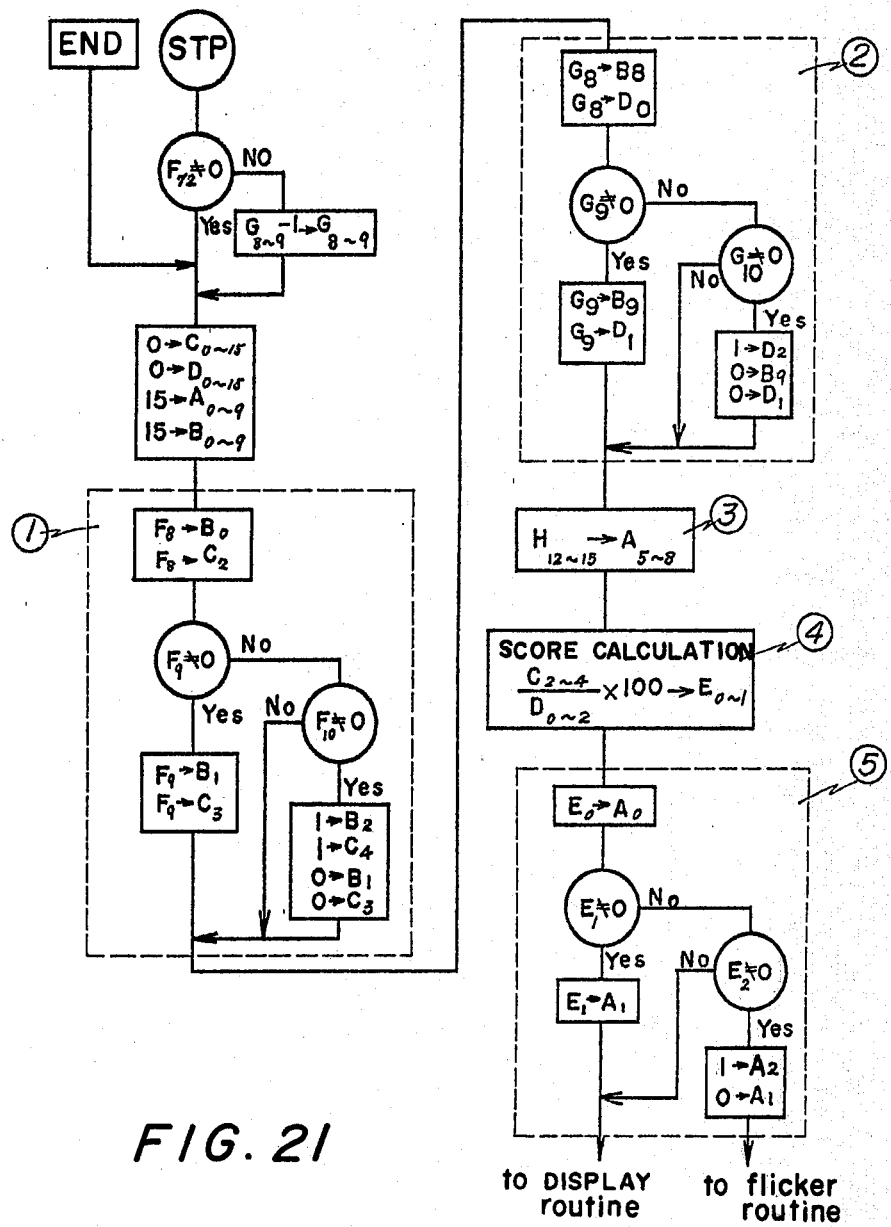

The problem number check routine functions to compare the generated problem number with the selected problem number. If the affirmative answer is not obtained, the random number stored in the memory $H_0$–$H_7$ is applied to the operation register $C_0$–$C_9$, and the program is skipped to the problem generation routine (*2 of FIG. 12). If the affirmative answer is obtained, the program is advanced to the end routine (FIG. 21).

When the entire problems are completed, or when the stop key STP is operated, the problem number, the score, the correct answer number and the exercise number are displayed. FIG. 21 shows a flow chart for displaying the problem number, the score, the correct answer number and the exercise number.

Now assume that the registers are in the following conditions:

| | |
|---|---|
| $A_5$–$A_3$ | 3C4 (where C is the multiplication code "12") |
| $B_6$ | = |
| $B_9$–$B_8$ | 11 |
| $F_8$ | 8 |
| $F_7$ | 0 |
| $G_9$–$G_8$ | 11 |
| $H_{15}$–$H_{12}$ | 123F (where F is the blank code "1111") |
| $H_9$–$H_8$ | 25 |

Under these conditions when the stop key STP is operated, the problem generation is terminated, and the problem number, the score, the correct answer number and the exercise number are displayed.

The contents of the flag $F_{72}$ are checked. When the flip-flop $F_{72}$ is in the set state, the operation is advanced to the following step. When the flip-flop $F_{72}$ is in the reset state, the information "1" is substracted from the contents stored in the section $G_8$–$G_9$. That is, the contents "11" of $G_8$–$G_9$ are changed to "10". At the following step, the memories $C_0$–$C_{15}$ and $D_0$–$D_{15}$ are cleared. The blank signal "15(1111)" is introduced into the memories $A_0$–$A_9$ and $B_0$–$B_9$.

At the following step ①, the contents stored in the correct answer number storage register $F_8$–$F_{10}$ are transferred to the section $B_0$–$B_2$, and stored in the section $C_2$–$C_4$. In this example, the number "8" is stored in the sections $B_0$–$C_2$.

Then, the program is advanced to the step ②. The contents stored in the problem number storage register $G_8$–$G_{10}$ are transferred to the sections $B_8$–$B_{10}$ and $D_0$–$D_2$. In this example, the information "10" is stored in the sections $B_8$–$B_9$ and $D_0$–$D_1$.

Then, the program is advanced to the step ③. The contents stored in the exercise number storage register $H_{12}$–$H_{15}$ are transferred to the section $A_5$–$A_8$.

Then, the program is advanced to the step ④ to obtain the score. The following calculation is conducted, and the result is stored in the section $E_0$–$E_2$.

$$\{(C_2-C_4)/(D_0-D_2)\} \times 100$$

In this example, the problem number is "10", and the correct answer number is "8" and therefore, the section $E_0$–$E_1$ stores the information "80".

Then, the program is advanced to the step ⑤. The contents stored in the section $E_0$–$E_2$ are transferred to the section $A_0$–$A_2$. In this example, the information "80" is stored in the section $A_0$–$A_1$. Hereafter, the program is advanced to the display routine to display the exercise number "123", the problem number "10", the score "80", and the correct answer number "8" as shown in FIG. 22.

If the 100% score is obtained, $E_2=1$ is detected to advance the program to the display flicker routine, wherein the displayed information is controlled to flicker.

The invention being thus described, it will be obvious that the same may be varied in many ways. Such variations are not to be regarded as a departure from the spirit and scope of the invention, and all such modifications are intended to be included with the scope of the following claims.

What is claimed is:

1. An electronic learning aid for teaching addition, subtraction, multiplication, or division, comprising:
   means for automatically generating a multidigit problem having two operands;
   first display means for displaying said problems;
   input means for introducing an operator calculated answer for said problem;
   second display means for displaying information other than said problem including said calculated answer and a remainder of a division problem where present in said answer, said second display means having a sufficient number of digits to display the calculated answer of a multiplication problem in which each operand contains at least two digits;
   determination means for detecting whether said calculated answer including remainder, if any, is the correct answer to said generated problem;
   clearing means for erasing said operator calculated answer from said second display means to allow the operator to introduce a new operator calculated answer for said problem; and
   means for disabling said clearing means when said determination means is enabled.

2. The learning aid of claim 1, further comprising:
   means for varying the difficulty level of the problems generated by said means for automatically generating by varying the number of digits in the operands of said problems.

3. The learning aid of claim 2, wherein said means for automatically generating produces the same group of multidigit problems when the same level of difficulty step and total problem number count are used.

4. The learning aid of claim 1, wherein a predetermined number of problems are generated by said means for generating.

5. The learning aid of claim 4, wherein said count accumulated in said first counter means is displayed on said second display means.

6. The learning aid of claim 4, wherein said count accumulated in said second counter means is displayed on said second display means.

7. The learning aid of claim 4, wherein a total problem number count can be selected to vary the predetermined number of problems to be presented.

8. The learning aid of claim 4, wherein said second display means flickers when said determination means determines that the calculated answer is the correct answer.

9. The learning aid of claim 4, further comprising:
   stop key means for selectively terminating the generation of said predetermined number of problems by said means for automatically generating;
   first counter means for accumulating a count indicative of the total number of said predetermined number of problems already generated by said means for generating;
   second counter means for accumulating a count indicative of the number of calculated answers determined to be correct by said determination means; and percentage calculation means for calculating the percentage of said generated problems in which said calculated answer is the correct answer;

said percentage calculation means being enabled by said stop key means to calculate the percentage of correct answers out of the number of problems generated prior to actuation of said stop key means;

said percentage calculation means further calculating the percentage of correct answers after generation of said predetermined number of problems.

10. The learning aid of claim 9, wherein said percentage calculated by said percentage calculation means is displayed on said second display means.

11. An electronic learning aid for teaching addition, subtraction, multiplication, or division, comprising:

means for automatically generating a predetermined number of multidigit problems having two operands;

first display means for displaying said problems;

input means for introducing an operator calculated answer for each said problem;

second display means for displaying information other than said problem including said calculated answer, said second display means having a sufficient number of digits to display the calculated answer of a multiplication problem in which each operand has at least two digits;

determination means for detecting whether said calculated answer is the correct answer to said generated problem;

percentage calculation means for calculating the percentage of said generated problems in which said calculated answer is the correct answer when said predetermined number of problems have been generated;

stop key means for selectively terminating the generation of problems by said means for automatically generating; and percentage score demand means responsive to actuation of said stop key means, said percentage score demand means energizing said percentage calculation means to determine the percentage of correct calculated answers upon actuation of said stop key means.

12. An electronic learning aid for teaching addition, subtraction, multiplication, or division, comprising:

means for automatically generating a multidigit problem having two operands, said automatic generating means generating a predetermined number of problems;

first display means for displaying said problems;

input means for introducing an operator calculated answer for said problem;

second display means for displaying information other than said problem including means displaying said calculated answer, said second display means having a sufficient number of digits to display the calculated answer of a multiplication problem in which each operand contains at least two digits;

determination means for detecting whether said calculated answer is the correct answer to said generated problem; and difficulty level selection means for varying the difficulty of said multidigit problems by varying the number of digits in said two operands.

13. The learning aid of claim 12, wherein the level of difficulty selected by said difficulty level selection means is displayed on said first display.

14. The learning aid of claim 13, wherein said second display means further displays the remainder of a division problem when present;

said determination means determining the correctness of the remainder calculated by said operator.

* * * * *